United States Patent
Zhou (10) Patent No.: US 9,961,020 B2
(45) Date of Patent: May 1, 2018

(54) PACKET FORWARDING SYSTEM, DEVICE, AND METHOD

(71) Applicant: Huawei Technologies Co., Ltd., Shenzhen, Guangdong (CN)

(72) Inventor: Wei Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 88 days.

(21) Appl. No.: 14/979,381

(22) Filed: Dec. 27, 2015

(65) Prior Publication Data

US 2016/0142340 A1    May 19, 2016

Related U.S. Application Data

(63) Continuation of application No. PCT/CN2013/078012, filed on Jun. 26, 2013.

(51) Int. Cl.
| | |
|---|---|
| *H04L 12/50* | (2006.01) |
| *H04L 12/947* | (2013.01) |
| *H04L 12/64* | (2006.01) |
| *H04L 29/08* | (2006.01) |
| *H04L 12/24* | (2006.01) |

(52) U.S. Cl.
CPC .......... *H04L 49/25* (2013.01); *H04L 12/6418* (2013.01); *H04L 41/0816* (2013.01); *H04L 67/306* (2013.01)

(58) Field of Classification Search
CPC ......... H04L 12/50; H04L 12/54; H04L 12/56; H04L 12/569; H04L 12/64; H04L 49/70

USPC ......................... 370/386, 389, 392, 400, 422
See application file for complete search history.

(56) References Cited

U.S. PATENT DOCUMENTS

| | | | |
|---|---|---|---|
| 5,790,935 A | 8/1998 | Payton | |
| 7,558,863 B1 | 7/2009 | Sitaraman et al. | |
| 7,774,826 B1 | 8/2010 | Romanek et al. | |
| 8,681,803 B2* | 3/2014 | Morita | H04L 41/28 370/231 |
| 8,837,286 B2* | 9/2014 | Mizukoshi | H04L 45/42 370/231 |
| 9,203,748 B2* | 12/2015 | Jiang | H04L 45/64 |

(Continued)

FOREIGN PATENT DOCUMENTS

| | | |
|---|---|---|
| CN | 102904804 A | 1/2013 |
| CN | 102904813 A | 1/2013 |

(Continued)

*Primary Examiner* — Dmitry H Levitan (57) ABSTRACT

Embodiments of the present invention provide a packet forwarding system. The packet forwarding system includes: a gateway control plane entity, configured to send a user profile establishment message to a mobile agent in a process of setting up a bearer, where the user profile establishment message includes a user profile of the bearer; the mobile agent, configured to store the user profile of the bearer; and a switch, configured to: after receiving a user plane packet and when no flow entry matching the user plane packet is found in a local flow table, send a flow entry request including a matching parameter in the user plane packet to the mobile agent, where the mobile agent is further configured to: after receiving the flow entry request, generate, according to the found user profile, a flow entry matching the user plane packet, and send the generated flow entry to the switch.

20 Claims, 5 Drawing Sheets

(56) References Cited

U.S. PATENT DOCUMENTS

| | | | |
|---|---|---|---|
| 9,397,949 B2* | 7/2016 | Sonoda | H04L 45/38 |
| 9,648,541 B2* | 5/2017 | Jeon | H04W 40/02 |
| 2010/0333137 A1 | 12/2010 | Hamano et al. | |
| 2013/0242879 A1* | 9/2013 | Yamato | H04W 40/20 370/328 |
| 2014/0241361 A1* | 8/2014 | Bosshart | H04L 45/74 370/392 |
| 2015/0063361 A1* | 3/2015 | Hamada | H04L 45/44 370/400 |
| 2015/0244590 A1* | 8/2015 | Lin | H04L 49/00 370/392 |
| 2015/0263953 A1* | 9/2015 | Sasaki | H04L 63/102 370/392 |

FOREIGN PATENT DOCUMENTS

| | | |
|---|---|---|
| EP | 1 274 259 A1 | 1/2003 |
| WO | WO 2008/093297 A1 | 8/2008 |

* cited by examiner

PACKET FORWARDING SYSTEM, DEVICE, AND METHOD

CROSS-REFERENCE TO RELATED APPLICATIONS

This application is a continuation of International Application No. PCT/CN2013/078012, filed on Jun. 26, 2013, which is hereby incorporated by reference in its entirety.

TECHNICAL FIELD

The present invention relates to communications technologies, and in particular, to a packet forwarding system, device, and method.

BACKGROUND

Switching devices, as key nodes in a network, are monopolized by existing device vendors, so that open interfaces of the switching devices are very limited, and many open ideas and protocols about the network cannot be tested and verified. The OpenFlow, as a set of switching standards having open interfaces and supporting multiple control, comes into being. The OpenFlow reconstructs, to a dynamic and changeable software defined network (SDN), conventional hardware that is physically fixed, which implements separation between a control plane and a forwarding plane. An OpenFlow switch (Switch) includes a flow table (Flow Table), a secure channel (Secure Channel), and an OpenFlow Protocol (OF Protocol). The flow table stores core information, so as to implement functions, such as searching, forwarding, collecting statistics, and filtering. The flow table includes multiple flow entries (Flow entry), one flow entry corresponds to one forwarding rule, and for a packet entering a switch, a destination port for forwarding is obtained by searching the flow table. The OpenFlow switch is connected to an external controller (Controller) through a secure channel (Secure Channel) by using the OpenFlow Protocol, and the controller searches and manages the flow table.

An SDN architecture is introduced to a next generation packet core network (SAE), so as to separate a function of a control plane of a gateway from a function of a forwarding plane of the gateway. The control plane of the gateway installs a flow table corresponding to an attached user onto the forwarding plane of the gateway, so as to implement forwarding of a data packet. A process of setting up a bearer for the attached user is as follows: an MME sends a create session request message to the control plane of the gateway; the control plane of the gateway encapsulates a user profile, such as a tunnel end point identifier (TEID for short) of a user, that is in a create session request, into a flow table and sends the flow table to the forwarding plane of the gateway; the forwarding plane of the gateway returns a flow table installation response message to the control plane of the gateway, and subsequently forwards a packet according to the flow table; and after receiving the flow table installation response message, the control plane of the gateway feeds back a create session response message to the MME, which indicates that the flow table is successfully created.

It may be seen from the foregoing process that, each time when a bearer of an attached user is generated, a flow entry is established on the forwarding plane of the gateway, which causes that a quantity of flow entries on the forwarding plane of the gateway is directly proportional to a quantity of attached users. However, the quantity of flow entries supported by the forwarding plane of a current gateway is relatively small currently, and there is an order of magnitude of difference between the quantity of flow entries and demands of a current user. In addition, a large quantity of flow entries is not beneficial for implementation of hardware of the forwarding plane, which causes deterioration of performance of the forwarding plane.

SUMMARY

Embodiments of the present invention provide a packet forwarding system, device, and method, to resolve a technical problem that there are a relatively large quantity of flow entries on a forwarding plane of a gateway, and improve performance of the forwarding plane.

According to a first aspect, an embodiment of the present invention provides a packet forwarding system, including: a gateway control plane entity and a gateway forwarding plane entity, where the gateway forwarding plane entity includes a mobile agent and a switch, where the gateway control plane entity is configured to send a user profile establishment message to the mobile agent in a process of setting up a bearer, where the user profile establishment message includes a user profile of the bearer;

the mobile agent is configured to: after receiving the user profile establishment message, store the user profile of the bearer;

the switch is configured to: after receiving a user plane packet and when no flow entry matching the user plane packet is found in a local flow table, send a flow entry request including a matching parameter in the user plane packet to the mobile agent; the mobile agent is further configured to: after receiving the flow entry request and in a case in which a user profile corresponding to the matching parameter in the user plane packet is found in a locally stored user profile, generate, according to the found user profile, a flow entry matching the user plane packet, and send the generated flow entry to the switch; and the switch is further configured to store, in the flow table, the flow entry sent by the mobile agent, and forward the user plane packet according to an instruction set in the flow entry sent by the mobile agent.

According to a second aspect, an embodiment of the present invention further provides a switch, where a gateway forwarding plane entity includes a mobile agent and the switch, and the switch includes:

a memory, configured to store a flow entry;

a transceiver, configured to receive a user plane packet; and a processor, configured to: when a flow table is searched for a flow entry matching the user plane packet, send a flow entry request including a matching parameter in the user plane packet to the mobile agent, where the transceiver is further configured to: when the processor finds, in the flow table, no flow entry matching the user plane packet, send the flow entry request including the matching parameter in the user plane packet to the mobile agent;

the transceiver is further configured to: in a case in which the mobile agent finds, in a locally stored user profile, a user profile corresponding to the matching parameter in the user plane packet, receive a flow entry sent by the mobile agent;

the processor is further configured to store, in the flow table, the flow entry sent by the mobile agent; and the transceiver is further configured to forward the user plane packet according to an instruction set in the flow entry sent by the mobile agent.

According to a third aspect, an embodiment of the present invention provides a mobile agent, where a gateway forwarding plane entity includes the mobile agent and a switch, and the mobile agent includes:

a transceiver, configured to receive, in a process of setting up a bearer, a user profile establishment message sent by a gateway control plane entity, where the user profile establishment message includes a user profile of the bearer; and a processor, configured to store, in a memory, the user profile of the bearer in the user profile establishment message, where the transceiver is further configured to search, by the switch, a local flow table for a flow entry matching a user plane packet, and when no flow entry matching the user plane packet is found in the local flow table, receive a flow entry request that includes a matching parameter in the user plane packet and that is sent by the switch;

the processor is further configured to search, in the memory, for a user profile corresponding to the matching parameter in the user plane packet, and in a case in which the user profile corresponding to the matching parameter in the user plane packet is found, generate, according to the found user profile, a flow entry matching the user plane packet; and the transceiver is further configured to send the generated flow entry to the switch.

According to a fourth aspect, an embodiment of the present invention provides a packet forwarding method, where a gateway user plane entity includes a switch and a mobile agent, and the method includes:

after receiving a user plane packet, searching, by the switch, a local flow table for a flow entry matching the user plane packet, where the flow entry in the flow table includes a match field and an instruction set;

when finding, in the local flow table, no flow entry matching the user plane packet, sending, by the switch, a flow entry request including a matching parameter in the user plane packet to the mobile agent;

in a case in which the mobile agent finds, in a locally stored user profile, a user profile corresponding to the matching parameter in the user plane packet, receiving and storing, by the switch, a flow entry sent by the mobile agent; and forwarding, by the switch, the user plane packet according to an instruction set in the flow entry sent by the mobile agent.

According to a fifth aspect, an embodiment of the present invention provides a bearer setup method, where a gateway user plane entity includes a switch and a mobile agent, and the method includes:

receiving and storing, by the mobile agent in a process of setting up a bearer, a user profile establishment message sent by a gateway control plane entity, where the user profile establishment message includes a user profile of the bearer;

when the switch finds, in a local flow table, no flow entry matching a user plane packet, receiving, by the mobile agent, a flow entry request that includes a matching parameter in the user plane packet and that is sent by the switch, where a flow entry includes a match field and an instruction set;

locally searching, by the mobile agent, for a user profile corresponding to the matching parameter in the user plane packet; and in a case in which the user profile corresponding to the matching parameter in the user plane packet is found, generating, according to the found user profile, a flow entry matching the user plane packet, and sending the generated flow entry to the switch.

In the foregoing technical solutions, after a switch on a forwarding plane of a gateway receives a user plane packet, if no flow entry matching the user plane packet is found locally, the switch sends a flow entry request to a mobile agent on the forwarding plane of the gateway, and acquires, from the mobile agent, an flow entry matching the user plane packet. After receiving the flow entry request, the mobile agent dynamically generates, according to a found user profile corresponding to a matching parameter in the user plane packet, the flow entry matching the user plane packet, and then sends the flow entry to the switch. The switch stores the flow entry sent by the mobile agent and forwards the user plane packet according to the received flow entry. The user profile corresponding to the matching parameter in the user plane packet is a user profile of a bearer set up for an attached user, and is delivered to the mobile agent by a gateway control plane entity in a process of setting up the bearer for the attached user. Because the flow entry sent by the mobile agent to the switch is a flow entry matching the user plane packet received by the switch, a flow entry locally stored by the switch is not flow entries of all attached users, but a flow entry of a bearer having a service, that is, a flow entry of an attached user having a service, which reduces a quantity of flow entries stored by the switch, and improves performance of the switch on the forwarding plane of the gateway.

DETAILED DESCRIPTION

In the embodiments of the present invention, a mobile agent entity is added to a forwarding plane of a gateway, and is responsible for maintaining content related to a movement behavior of a user, for example, content related to a movement behavior such as setting up a bearer, deleting a bearer, or modifying a bearer. A switch on the forwarding plane of the gateway is responsible for only forwarding a packet, so that a quantity of flow entries stored in an MS is related to a quantity of attached users having a service currently, and is unrelated to a quantity of current attached users.

A flow entry includes a match field (match field), counters (counters), and an instruction set (instructions), and different manufacturers may design, according to respective demands, flow tables having different functions. The match field of the flow entry includes an input interface, and a source IP address, a destination IP address, and a TEID that are of a packet, and the like. Currently, the match field has 36 types of matching items. Counters of a flow table collect statistics about traffic information, such as an activity entry, a quantity of searching times, and a quantity of packet sending times, and can be maintained for each flow table, each flow, each port, and each queue. The instruction set of the flow entry indicates an instruction that should be executed by a data packet matching the flow entry. The instruction set of the flow entry includes required actions (Required Actions) and optional actions (Optional Actions). Three required actions are: forwarding a flow to a given port; encapsulating a packet of the flow and forwarding the packet of the flow to a controller on the switch, where the controller determines whether to add a flow to the flow table; and discarding the packet. The optional actions include: setting a queue id of a data packet, and specifying which queue of the port the data packet is output to; supporting a VLAN and an MPLS tag; setting or modifying values of different header fields; and modifying an IPv4 TTL, an IPv6 Hop Limit, or an MPLS TTL.

Figure 1:
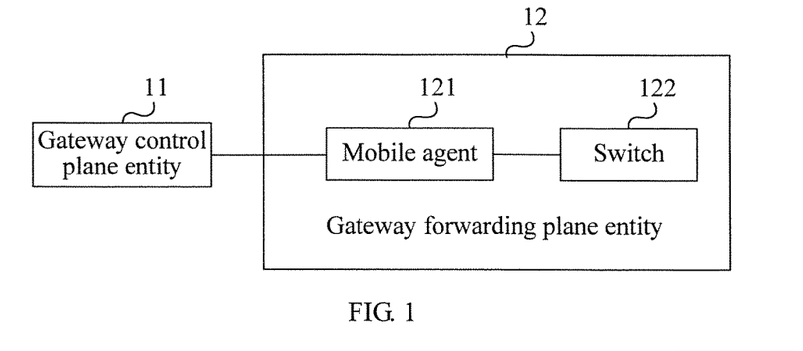
FIG. 1 is a schematic structural diagram of a packet forwarding system according to an embodiment of the present invention.

FIG. 1 is a schematic structural diagram of a packet forwarding system according to an embodiment of the present invention. As shown in FIG. 1, the system provided by this embodiment includes: a gateway control plane entity 11 and a gateway forwarding plane entity 12. The gateway forwarding plane entity 12 includes a mobile agent 121 and a switch 122. The mobile agent 121 and the switch 122 may be different logical modules on the gateway forwarding plane entity 12, and may be deployed at a same physical location, or may be deployed at different physical locations.

The gateway control plane entity 11 is configured to send a user profile establishment message to the mobile agent in a process of setting up a bearer, where the user profile establishment message includes a user profile of the bearer.

In a process of setting up a bearer for an attached user, the gateway control plane entity delivers a user profile of the bearer to a mobile agent on a forwarding plane of a gateway, instead of delivering a flow entry of the bearer to the mobile agent. The flow entry includes a match field and an instruction set, where the match field includes a user profile. One attached user has one or more bearers. Generally, one bearer correspondingly has two flow entries in a flow table, and the two flow entries respectively correspond to an uplink packet and a downlink packet.

The user profile of the bearer includes at least information, such as an international mobile subscriber identity (IMSI for short), a mobile subscriber integrated services digital network (MSISDN for short), a TEID, an IP address, and an access point name (APN for short).

The mobile agent 121 is configured to store the user profile according to the user profile establishment message. Optionally, the user profile establishment message may further include a user status.

After receiving the user profile establishment message, the mobile agent locally stores the user profile that is in the user profile establishment message. Each time when one bearer is set up, the gateway control plane entity delivers a user profile establishment message to the mobile agent, and therefore, the mobile agent may store user profiles of all bearers. A primary key value of the user profile stored by the mobile agent may be an IMSI.

The switch 122 is configured to: after receiving a user plane packet and when no flow entry matching the user plane packet is found in a local flow table, send a flow entry request including a matching parameter in the user plane packet to the mobile agent, where the flow entry includes a match field and an instruction set. Further, the switch 122 is further configured to: after receiving the user plane packet and when a flow entry matching the user profile is found in the flow table, forward the user plane packet according to an instruction set in the flow entry matching the user profile.

The matching parameter in the user plane packet may include information, such as a source IP address, a destination IP address, and a TEID. The switch locally stores the flow table. After receiving the user plane packet, the switch performs matching between the matching parameter, such as the IP address and the TEID that are in the user plane packet, and a match field of each flow entry in the flow table. If a flow entry matching the matching parameter exists in the flow table, the flow entry matching the user plane packet is found; and if no flow entry matching the matching parameter exists in the flow table, no flow entry matching the user plane packet is found. When the switch locally finds a flow entry matching a current user plane packet, the switch forwards the user plane packet according to an instruction set in the found flow entry.

The mobile agent 121 is further configured to: after receiving the flow entry request and in a case in which a user profile corresponding to the matching parameter in the user plane packet is found in a locally stored user profile, generate, according to the found user profile, a flow entry matching the user plane packet, and send the generated flow entry to the switch. The switch 122 is further configured to store, in the flow table, the flow entry sent by the mobile agent, and forward the user plane packet according to an instruction set in the flow entry sent by the mobile agent.

When no flow entry matching the user plane packet is found locally, the switch sends a flow entry acquiring request to the mobile agent. After receiving the flow entry request, the mobile agent searches the locally stored user profile for the user profile corresponding to the matching parameter in the user plane packet. In a case in which the mobile agent locally finds the corresponding user profile, the mobile agent dynamically generates, according to the found user profile, a flow entry matching the user plane packet, and sends the generated flow entry to the switch. A flow entry includes a match field and an instruction set, where the instruction set includes actions. The match field includes information, such as an IP address and a TEID that are in the found user profile, and an action corresponding to the match field is obtaining a corresponding port of the switch according to an APN in the found user profile. An action refers to sending a user plane packet to a port of the switch. The MA maintains a mapping relationship between an APN in a user profile and a port of the switch. When the MA generates the instruction set of the flow entry, the corresponding port of the switch is obtained according to an APN in the found user profile, which is used as a corresponding action in the match field. Optionally, the user profile corresponding to the matching parameter in the user plane packet further includes a user status, and the flow entry generated according to the user profile may further include the user status. When a user is in an idle state, a corresponding flow entry cannot be used, and when the user is in a connected state, a corresponding flow entry can be used.

After receiving the flow entry sent by the mobile agent, the switch stores the flow entry in the local flow table, and forwards the currently received user plane packet according to the instruction set in the flow entry. In an initial stage, the flow table of the switch is empty, and has no flow entry. In a process of processing the received user plane packet, if no flow entry matching the current user plane packet is stored in the local flow table, the switch acquires a flow entry from the mobile agent and forwards the current user plane packet according to the flow entry. The switch further stores the flow entry acquired from the mobile agent, so that when another user plane packet of a same bearer is received, the switch may find a matching flow entry in the local flow table without acquiring the flow entry from the mobile agent. Because the flow entry that is stored by the switch and acquired from the mobile agent is the flow entry matching the current user plane packet, the flow entry locally stored by the switch is a flow entry of an attached user having a service, and the switch does not store a flow table of an attached user having no service; therefore, what is stored by the switch is not flow entries of all attached users.

Optionally, the mobile agent 121 is further configured to: after receiving the flow entry request and in a case in which no user profile corresponding to the matching parameter in the user plane packet is found locally, send a flow entry acquiring failure message to the switch. The switch 122 is further configured to: after receiving the flow entry acquiring failure message, discard the user plane packet.

In a case in which no user profile corresponding to the matching parameter in the user plane packet is found locally, the mobile agent sends the flow entry acquiring failure message to the switch, and the switch may discard the packet after receiving the flow entry acquiring failure message.

Optionally, in order to reduce a quantity of flow entries stored by the switch, the switch is further configured to periodically collect statistics about access traffic of each stored flow entry, and delete a flow entry whose access traffic is zero.

In the forwarding system provided by this embodiment, after a switch on a forwarding plane of a gateway receives a user plane packet, if no flow entry matching the user plane packet is found locally, the switch sends a flow entry request to a mobile agent on the forwarding plane of the gateway, and acquires, from the mobile agent, an entry matching the user plane packet. After receiving the flow entry request, the mobile agent dynamically generates, according to a found user profile corresponding to a matching parameter in the user plane packet, a flow entry matching the user plane packet, and then sends the flow entry to the switch. The switch stores the flow entry sent by the mobile agent and forwards the user plane packet according to the received flow entry. The user profile corresponding to the matching parameter in the user plane packet is a user profile of a bearer setting up for an attached user, and is delivered to the mobile agent by a gateway control plane entity in a process of setting up the bearer for the attached user. Because the flow entry sent by the mobile agent to the switch is a flow entry matching the user plane packet received by the switch, a flow entry locally stored by the switch is not flow entries of all attached users, but a flow entry of a bearer having a service, that is, a flow entry of an attached user having a service, which reduces a quantity of flow entries stored by the switch, and improves performance of the switch on the forwarding plane of the gateway.

Optionally, after the bearer is modified for the attached user, the user profile of the bearer changes. In order to make the user profile stored by the mobile agent be a latest user profile of the bearer, the gateway control plane entity further instructs the mobile agent to modify the user profile of the bearer, and the mobile agent further instructs the switch to delete or modify the flow entry matching the user profile.

The gateway control plane entity is further configured to send a user profile modification message to the mobile agent in a process of modifying the bearer, where the user profile modification message includes an index value of the user profile of the bearer.

The mobile agent is further configured to modify the user profile of the bearer according to the user profile modification message.

In addition, the mobile agent may further enable the switch to modify, in the local flow table, the flow entry matching the user profile of the bearer, which is specifically as follows:

The mobile agent is further configured to modify the user profile of the bearer according to the user profile modification message, generate an instruction set according to a modified user profile, and send a flow entry modification message to the mobile switch, where the flow entry modification message includes the generated instruction set and a value of a match field in a flow entry to be modified; or modify the user profile of the bearer according to the user profile modification message. The mobile agent is further configured to send a flow entry deletion message to the mobile switch, where the flow entry deletion message includes a value of a match field in a flow entry to be deleted.

The switch is further configured to delete, from the flow table according to the flow entry deletion message, a flow entry indicated by the flow entry deletion message; or modify, in the flow table according to the flow entry modification message, an instruction set in a flow entry indicated by the flow entry deletion message.

Optionally, after the user is detached, that is, the bearer is deleted, the mobile agent no longer needs to store a user profile of the bearer. In order to reduce a quantity of user profiles stored by the mobile agent, in a process of deleting the bearer, the gateway control plane entity further instructs the mobile agent to delete the user profile of the bearer, and the mobile agent further instructs the switch to delete a flow entry matching the user profile.

The gateway control plane entity is further configured to send a user profile deletion message to the mobile agent in the process of deleting the bearer, where the user profile deletion message includes the index value of the user profile of the bearer. The mobile agent is further configured to delete the user profile of the bearer according to the user profile deletion message, and send a flow entry deletion message to the switch, where the flow entry deletion message includes the value of the match field in the flow entry to be deleted. The switch is further configured to: after receiving the flow entry deletion message, delete, from the flow table, a flow entry indicated by the flow entry deletion message.

Figure 2:
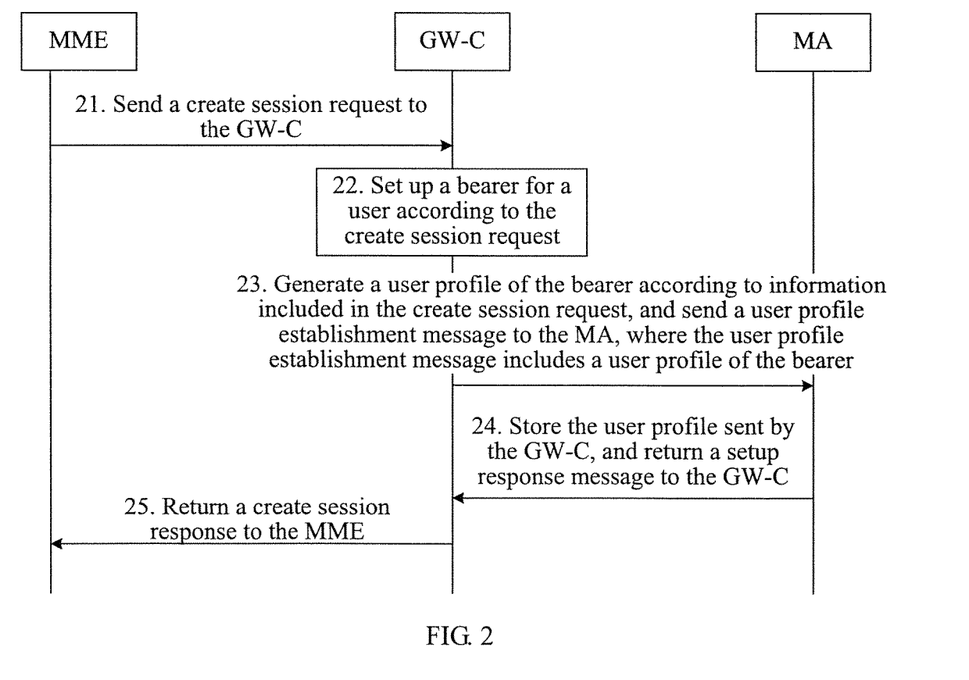
FIG. 2 is a flowchart of a bearer setup method according to an embodiment of the present invention.

FIG. 2 is a flowchart of a bearer setup method according to an embodiment of the present invention. As shown in FIG. 2, a mobile control node (Mobile Controller, MC for short) includes a mobile management entity (Mobile Management Entity, MME for short) and a GW-C. The GW-C is a gateway control plane entity, and a gateway forwarding plane entity includes a mobile agent (Mobile Agent, MA for short) and a mobile switch (Mobile Switch, MS for short). A process of setting up a bearer for a user is also a user access process. As shown in FIG. 2, the method provided by this embodiment includes the following steps:

Step 21: The MME sends a create session request to the GW-C. The create session request may be a Create Session Report message. The create session request is used for setting up the bearer for the user.

The create session request includes information, such as an IMSI, an MSISDN, a TEID, an IP address, and an APN, and further includes other information, such as a PDN GW address, a RAT type, a default EPS bearer QoS, a PDN type, an APN-AMBR, an EPS bearer ID, a protocol configuration option PCO, and a switching indication.

Step 22: The GW-C sets up a bearer for a user according to the create session request.

Step 23: The GW-C generates a user profile of the bearer according to information included in the create session request, and sends a user profile establishment message to the MA, where the user profile establishment message includes the user profile of the bearer. The user profile establishment message may be a user-defined User Profile Indicate message.

The user profile generated by the GW-C for the bearer according to the information included in the create session request includes at least information, such as an IMSI, an MSISDN, a TEID, an IP address, and an APN.

A message between the GW-C and the MA may be a modified OpenFlow message. The message between the GW-C and the MA may also be carried by a GTP message, or may be in a user-defined message format, which is not limited in the present invention.

Step 24: The MA stores the user profile sent by the GW-C, and returns a setup response message to the GW-C. The setup response message may be a user-defined User Profile Indicate Response message.

Step 25: The GW-C returns a create session response to the MME. The create session response may be a Create Session Response message.

In a process of setting up a bearer for an attached user, the MC delivers a user profile of the bearer set up for the attached user to the MA.

Figure 3:
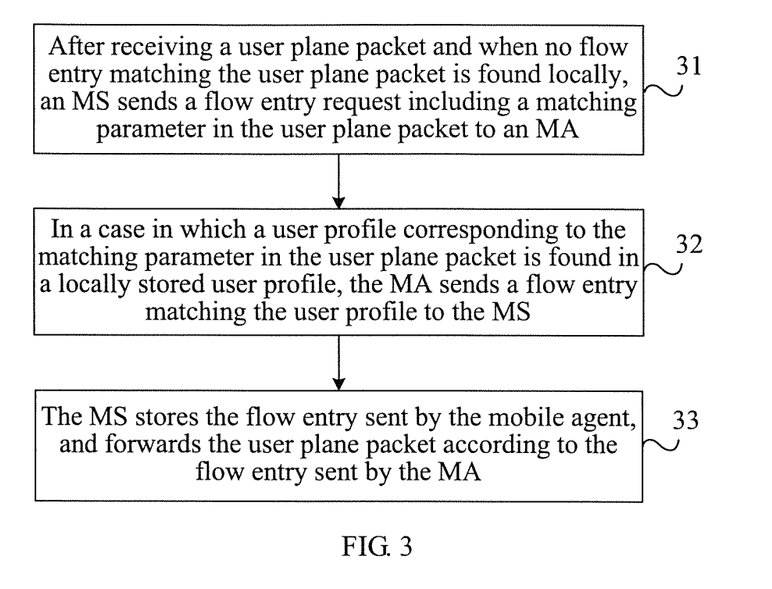
FIG. 3 is a flowchart of a packet forwarding method according to an embodiment of the present invention.

FIG. 3 is a flowchart of a packet forwarding method according to an embodiment of the present invention. This embodiment is executed by an MS on a forwarding plane of a gateway. As shown in FIG. 3, the method provided by this embodiment includes the following steps:

Step 31: After the MS receives a user plane packet, when no flow entry matching the user plane packet is found locally, the MS sends a flow entry request including a matching parameter in the user plane packet to an MA.

Step 32: In a case in which a user profile corresponding to the matching parameter in the user plane packet is found in a locally stored user profile, the MA sends a flow entry matching the user profile to the MS.

Step 33: The MS stores the flow entry sent by the mobile agent, and forwards the user plane packet according to the flow entry sent by the MA.

The matching parameter in the user plane packet may include information, such as a source IP address, a destination IP address, and a TEID. After receiving the user plane packet, the MS performs matching between the matching parameter, such as the IP address and the TEID that are in the user plane packet, and a match field of each flow entry in the flow table. If a flow entry matching the matching parameter exists in the flow table, the flow entry matching the user plane packet is found; and if no flow entry matching the matching parameter exists in the flow table, no flow entry matching the user plane packet is found. When the MS locally finds a flow entry matching a current user plane packet, the MS forwards the user plane packet according to an instruction set in the found flow entry.

The MS locally stores the flow table, and in an initial stage, the flow table is empty. In a process of processing the received user plane packet, if no flow entry matching the current user plane packet is stored in the local flow table, a flow entry is acquired from the mobile agent and the current user plane packet is forwarded according to the flow entry. The switch further stores the flow entry acquired from the mobile agent, so that when another user plane packet of a same bearer is received, the switch may find a matching flow entry in the local flow table without acquiring the flow entry from the mobile agent. Because the flow entry that is stored by the switch and acquired from the mobile agent is the flow entry matching the current user plane packet, the flow entry locally stored by the switch is a flow entry of an attached user having a service, and the switch stores does not store a flow table of an attached user having no service; therefore, what is stored by the switch is not flow entries of all attached users.

Figure 4:
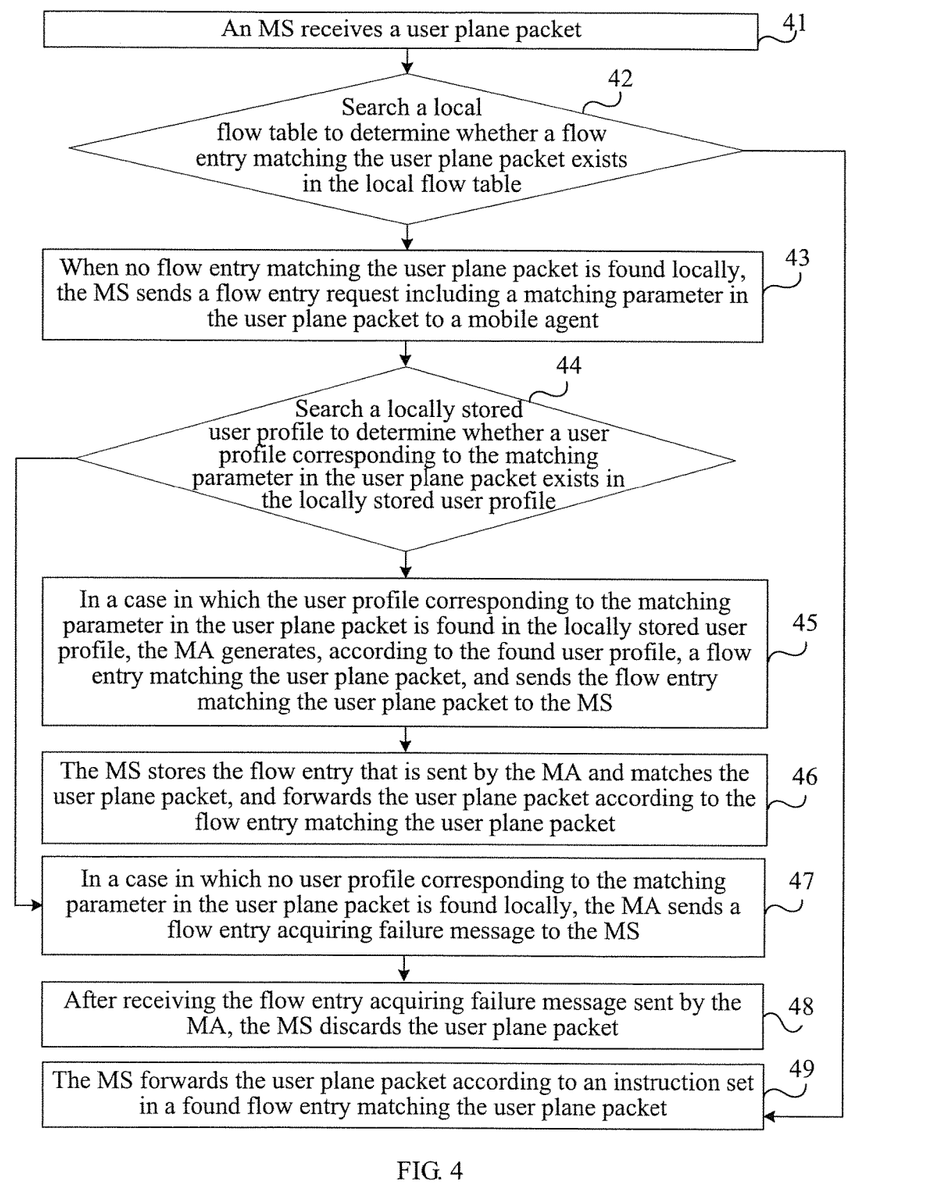
FIG. 4 is a flowchart of another packet forwarding method according to an embodiment of the present invention.

FIG. 4 is a flowchart of another packet forwarding method according to an embodiment of the present invention. As shown in FIG. 4, the method provided by this embodiment includes the following steps:

Step 41: An MS receives a user plane packet.

Step 42: The MS searches a local flow table to determine whether a flow entry matching the user plane packet exists in the local flow table. If the flow entry is found, step 49 is performed; otherwise, step 43 is performed.

Step 43: When no flow entry matching the user plane packet is found locally, the MS sends a flow entry request including a matching parameter in the user plane packet to the mobile agent.

Step 44: The MA searches a locally stored user profile to determine whether a user profile corresponding to the matching parameter in the user plane packet exists in the locally stored user profile. If the user profile is found, step 45 is performed; otherwise, step 47 is performed.

A user profile stored by the MA corresponds to a bearer in a one-to-one manner, that is, one bearer corresponds to one user profile.

Step 45: In a case in which the user profile corresponding to the matching parameter in the user plane packet is found in the locally stored user profile, the MA generates, according to the found user profile, a flow entry matching the user plane packet, and sends the flow entry matching the user plane packet to the MS.

In a case in which the mobile agent locally finds the corresponding user profile, the mobile agent dynamically generates, according to the found user profile, a flow entry matching the user plane packet, and sends the generated flow entry to the switch. A flow entry includes a match field and an instruction set, where the instruction set includes actions. The match field includes information, such as an IP address and a TEID that are in the found user profile, and an action corresponding to the match field is obtaining a corresponding port of the switch according to an APN in the found user profile. An action refers to sending a user plane packet to a port of the switch. The MA maintains a mapping relationship between an APN in a user profile and a port of the switch. When the MA generates the instruction set of the flow entry, the corresponding port of the switch is obtained according to an APN in the found user profile, which is used as a corresponding action in the match field.

Step 46: The MS stores the flow entry that is sent by the MA and matches the user plane packet, and forwards the user plane packet according to the flow entry matching the user plane packet.

Step 47: In a case in which no user profile corresponding to the matching parameter in the user plane packet is found locally, the MA sends a flow entry acquiring failure message to the MS.

Step 48: After receiving the flow entry acquiring failure message sent by the MA, the MS discards the user plane packet.

Step 49: The MS forwards the user plane packet according to an instruction set in a found flow entry matching the user plane packet.

After receiving a user plane packet, an MS first searches a local flow table for a flow entry matching the user plane packet; if a matching flow entry is found, the MS forwards the user plane packet according to the found flow entry; otherwise, the MS acquires a dynamically generated flow entry from an MA, stores the flow entry acquired from the MA, and forwards the user plane packet according to the acquired flow entry. Because the flow entry stored by the MS is a flow entry matching the received user plane packet, the MS stores a flow entry of an attached user having a service, instead of flow entries of all attached users.

Figure 5:
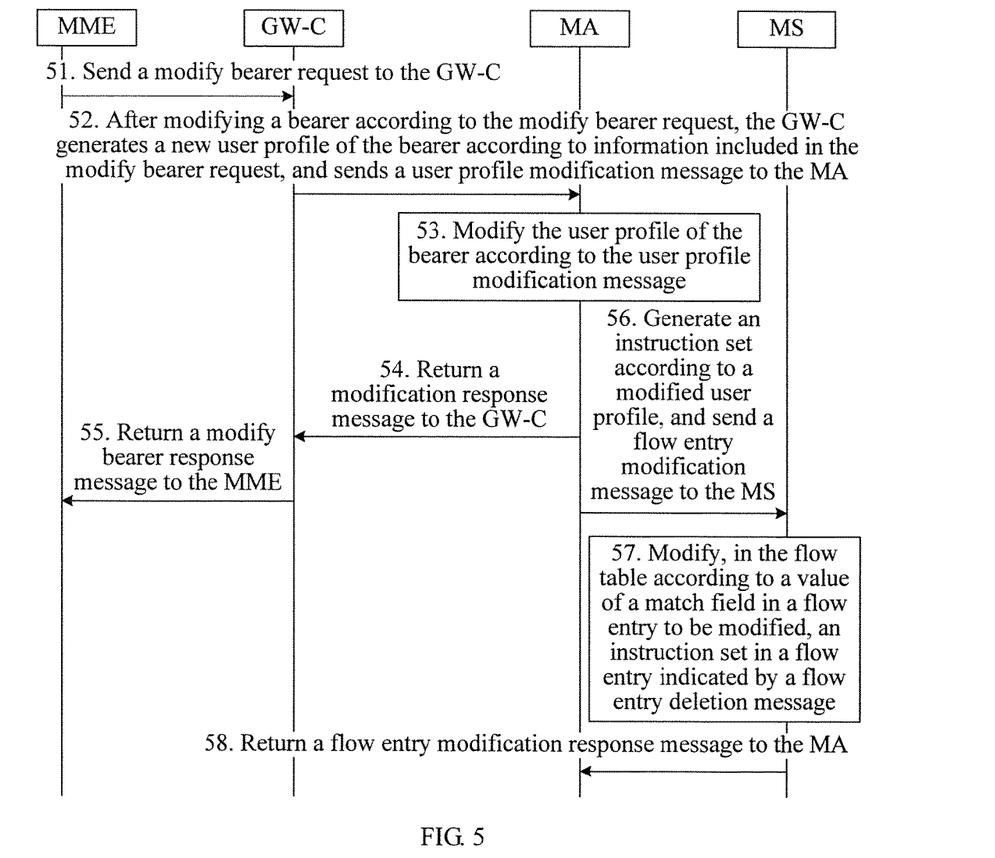
FIG. 5 is a flowchart of a bearer modifying method according to an embodiment of the present invention.

FIG. 5 is a flowchart of a bearer modifying method according to an embodiment of the present invention. As shown in FIG. 5, the method provided by this embodiment includes the following steps:

Step 51: An MME sends a modify bearer request to a GW-C.

Step 52: After modifying a bearer according to the modify bearer request, the GW-C generates a new user profile of the bearer according to information included in the modify bearer request, and sends a user profile modification message to an MA, where the user profile modification message includes an index value of a user profile of the bearer, and the new user profile of the bearer. The user profile modification message may be a user-defined User Profile Indicate message.

Step 53: The MA modifies the user profile of the bearer according to the user profile modification message.

The MA locally finds, according to the index value, which is included in the user profile modification message, of the user profile of the bearer, a user profile to be modified, and modifies the found user profile to the new user profile of the bearer.

Step 54: The MA returns a modification response message to the GW-C. The modification response message may be a user-defined User Profile Indicate Response message.

Step 55: The GW-C returns a modify bearer response message to the MME.

Step 56: The MA generates an instruction set according to a modified user profile, and sends a flow entry modification message to an MS, where the flow entry modification message includes the generated instruction set and a value of a match field in a flow entry to be modified.

Step 56 and step 54 may be simultaneously performed, or step 56 may be performed before step 54.

Step 57: The MS modifies, in the flow table according to the value of the match field in the flow entry to be modified, an instruction set in a flow entry indicated by a flow entry deletion message.

The MS searches for the flow entry to be modified according to the value of the match field in the flow entry to be modified, and modifies an instruction set in a found flow entry to the instruction set carried by the flow entry modification message.

Step 58: The MS returns a flow entry modification response message to the MA.

Further, after modifying the user profile of the bearer according to the user profile modification message, the MA may further send the flow entry deletion message to the MS, where the flow entry deletion message includes a value of a match field in a flow entry to be deleted. The MS finds, in the flow table according to the value of the match field in the flow entry to be deleted, the flow entry to be deleted, and deletes, from the flow table, the flow entry indicated by the flow entry deletion message.

In a process of modifying a bearer for an attached user, an MC delivers an updated user profile to an MA, so that the MA updates a locally stored user profile.

Figure 6:
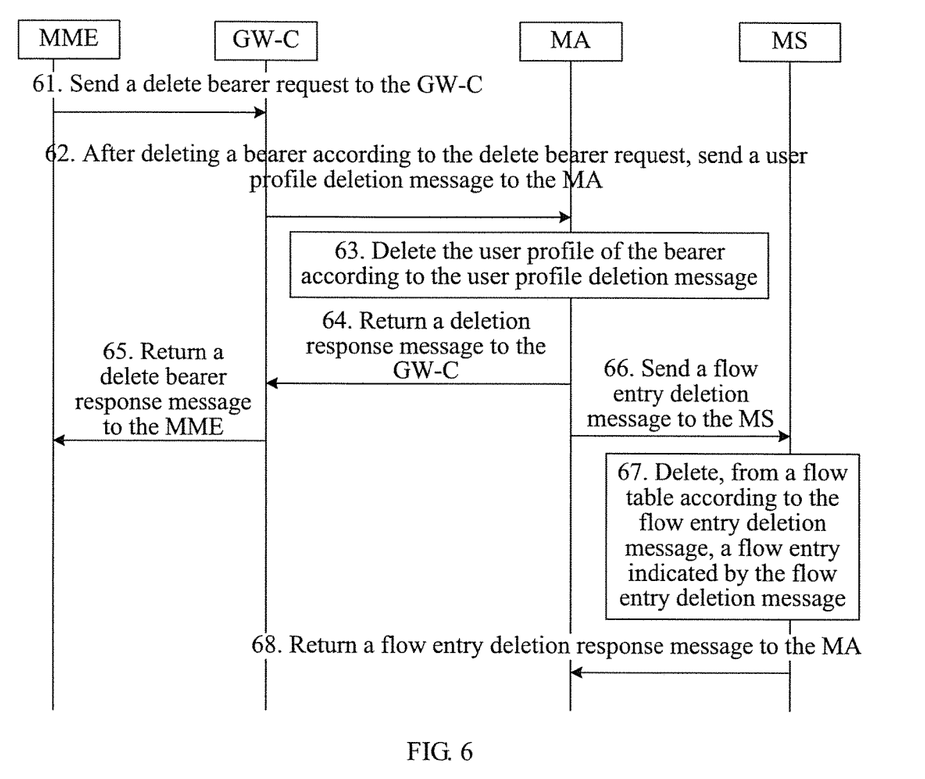
FIG. 6 is a flowchart of a bearer deleting method according to an embodiment of the present invention.

FIG. 6 is a flowchart of a bearer deleting method according to an embodiment of the present invention. A process of deleting a bearer is also a process of detaching a user. As shown in FIG. 6, the method provided by this embodiment includes the following steps:

Step 61: An MME sends a delete bearer request to a GW-C.

Step 62: After deleting a bearer according to the delete bearer request, the GW-C sends a user profile deletion message to an MA, where the user profile deletion message includes an index value of a user profile of the bearer. The user profile deletion message may be a user-defined User Profile Indicate message.

Step 63: The MA deletes the user profile of the bearer according to the user profile deletion message.

Step 64: The MA returns a deletion response message to the GW-C, where the deletion response message may be a user-defined User Profile Indicate Response message.

Step 65: The GW-C returns a delete bearer response message to the MME.

Step 66: The MA sends a flow entry deletion message to an MS, where the flow entry deletion message includes a value of a match field in a flow entry to be deleted.

Step 67: The MS deletes, from a flow table according to the flow entry deletion message, a flow entry indicated by the flow entry deletion message.

Step 68: The MS returns a flow entry deletion response message to the MA.

In a process of deleting a bearer for an attached user, an MC instructs an MA to delete a user profile of the bearer.

Figure 7:
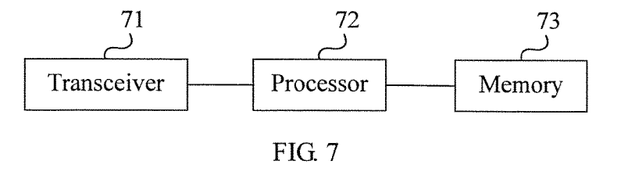
FIG. 7 is a schematic structural diagram of a switch according to an embodiment of the present invention.

FIG. 7 is a schematic structural diagram of a switch according to an embodiment of the present invention. As shown in FIG. 7, the switch provided by this embodiment includes: a transceiver 71, a processor 72, and a memory 73.

The memory 73 is configured to store a flow table, where a flow entry in the flow table includes a match field and an instruction set.

The transceiver 71 is configured to receive a user plane packet.

The processor 72 is configured to: when the flow table is searched for a flow entry matching the user plane packet, send a flow entry request including a matching parameter in the user plane packet to a mobile agent.

The transceiver 71 is further configured to: when the processor finds, in the flow table, no flow entry matching the user plane packet, send the flow entry request including the matching parameter in the user plane packet to the mobile agent.

The transceiver 71 is further configured to: in a case in which the mobile agent finds, in a locally stored user profile, a user profile corresponding to the matching parameter in the user plane packet, receive a flow entry sent by the mobile agent.

The processor 72 is further configured to store, in the flow table, the flow entry sent by the mobile agent.

The transceiver 71 is configured to forward the user plane packet according to an instruction set in the flow entry sent by the mobile agent.

Optionally, the processor is further configured to: after receiving the user plane packet and when a flow entry matching the user profile is found in the flow table, forward the user plane packet according to an instruction set in the flow entry matching the user profile.

Optionally, the processor is further configured to periodically collect statistics about access traffic of each flow entry stored in the flow table, and delete a flow entry whose access traffic is zero.

For this embodiment, reference may be made to functions of the switch in the embodiment corresponding to FIG. 1 and the embodiment corresponding to FIG. 3.

In a process in which a mobile control plane entity deletes a bearer, the mobile agent deletes, on the switch, a flow entry generated according to a user profile of the bearer.

The transceiver is further configured to receive a flow entry deletion message sent by the mobile agent, where the flow entry deletion message includes a value of a match field in a flow entry to be deleted.

The processor is further configured to delete, from the flow table, a flow entry indicated by the flow entry deletion message.

For this embodiment, reference may be made to the functions of the switch in the embodiment corresponding to FIG. 6.

In a process in which the mobile control plane entity modifies the bearer, the mobile agent deletes or modifies, on the switch, a flow entry generated according to an old user profile of the bearer.

The transceiver is further configured to receive a flow entry modification message sent by the mobile agent, where the flow entry modification message includes the generated instruction set and a value of a match field in a flow entry to be modified.

The processor is further configured to modify, in the flow table according to the flow entry modification message, an instruction set in the flow entry indicated by the flow entry deletion message.

For this embodiment, reference may be made to the functions of the switch in the embodiment corresponding to FIG. 5.

Figure 8:
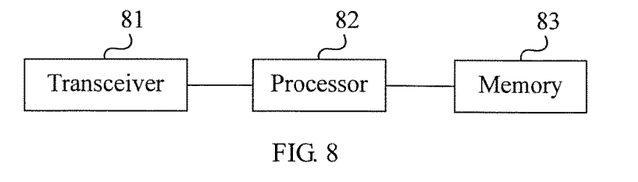
FIG. 8 is a schematic structural diagram of a mobile agent according to an embodiment of the present invention.

FIG. 8 is a schematic structural diagram of a mobile agent according to an embodiment of the present invention. As shown in FIG. 8, the switch provided by this embodiment includes: a transceiver 81, a processor 82, and a memory 83.

The transceiver 81 is configured to receive, in a process of setting up a bearer, a user profile establishment message sent by a gateway control plane entity, where the user profile establishment message includes a user profile of the bearer.

The processor 82 is configured to store, in the memory 83, the user profile of the bearer in the user profile establishment message.

The transceiver 81 is further configured to search, by the switch, a local flow table for a flow entry matching a user plane packet, and when no flow entry matching the user plane packet is found in the local flow table, receive a flow entry request that includes a matching parameter in the user plane packet and that is sent by the switch, where the flow entry includes a match field and an instruction set.

The processor 82 is further configured to search, in the memory, for a user profile corresponding to the matching parameter in the user plane packet, and in a case in which the user profile corresponding to the matching parameter in the user plane packet is found, generate, according to the found user profile, a flow entry matching the user plane packet.

The transceiver 81 is further configured to send the generated flow entry to the switch.

For this embodiment, reference may be made to the functions of the switch in the embodiment corresponding to FIG. 2.

Optionally, in a process of deleting the bearer, internal processing performed by the mobile agent is as follows:

the transceiver is further configured to receive, in the process of deleting the bearer, a user profile deletion message sent by the gateway control plane entity, where the user profile deletion message includes an index value of the user profile of the bearer;

the processor is further configured to delete the user profile, which is stored in the memory, of the bearer according to the user profile deletion message; and the transceiver is further configured to send a flow entry deletion message to the switch, where the flow entry deletion message includes a value of a match field in a flow entry to be deleted.

For this embodiment, reference may be made to the functions of the switch in the embodiment corresponding to FIG. 6.

Optionally, in a process of modifying the bearer, internal processing performed by the mobile agent is as follows:

the transceiver is further configured to receive, in the process of modifying the bearer, a user profile modification message sent by the gateway control plane entity, where the user profile modification message includes the index value of the user profile of the bearer;

the processor is further configured to modify the user profile, which is stored in the memory, of the bearer according to the user profile modification message; and the transceiver is further configured to send the flow entry deletion message to the mobile switch, where the flow entry deletion message includes the value of the match field in the flow entry to be deleted.

Optionally, the processor is further configured to: after modifying the user profile of the bearer, generate an instruction set according to a modified user profile; and the transceiver is further configured to send a flow entry modification message to the mobile switch, where the flow entry modification message includes the generated instruction set and a value of a match field in a flow entry to be modified.

For this embodiment, reference may be made to the functions of the switch in the embodiment corresponding to FIG. 5.

The present invention further provides a switch for performing a packet forwarding method. A gateway forwarding plane entity includes a mobile agent and the switch, and the switch includes:

a storage unit, configured to store a flow entry;

a transceiver unit, configured to receive a user plane packet; and a processing unit, configured to: when the flow table is searched for a flow entry matching the user plane packet, send a flow entry request including a matching parameter in the user plane packet to the mobile agent, where the transceiver unit is further configured to: when the processing unit finds, in the flow table, no flow entry matching the user plane packet, send the flow entry request including the matching parameter in the user plane packet to the mobile agent;

the transceiver unit is further configured to: in a case in which the mobile agent finds, in a locally stored user profile, a user profile corresponding to the matching parameter in the user plane packet, receive a flow entry sent by the mobile agent;

the processing unit is further configured to store, in the flow table, the flow entry sent by the mobile agent; and the transceiver unit is further configured to forward the user plane packet according to an instruction set in the flow entry sent by the mobile agent.

Optionally, the transceiver unit is further configured to receive a flow entry deletion message sent by the mobile agent, where the flow entry deletion message includes a value of a match field in a flow entry to be deleted; and the processing unit is further configured to delete, from the flow table, a flow entry indicated by the flow entry deletion message.

Optionally, the transceiver unit is further configured to receive a flow entry modification message sent by the mobile agent, where the flow entry modification message includes the generated instruction set and a value of a match field in a flow entry to be modified; and the processing unit is further configured to modify, in the flow table according to the flow entry modification message, an instruction set in the flow entry indicated by the flow entry deletion message.

Optionally, the processing unit is further configured to: after receiving the user plane packet and when a flow entry matching the user profile is found in the flow table, forward the user plane packet according to an instruction set in the flow entry matching the user profile.

Optionally, the processing unit is further configured to periodically collect statistics about access traffic of each flow entry stored in the flow table, and delete a flow entry whose access traffic is zero.

The present invention further provides a mobile agent for performing a bearer setup method. A gateway forwarding plane entity includes the mobile agent and a switch, and the mobile agent includes:

a transceiver unit, configured to receive, in a process of setting up a bearer, a user profile establishment message sent by a gateway control plane entity, where the user profile establishment message includes a user profile of the bearer; and a processing unit, configured to store, in a storage unit, the user profile of the bearer in the user profile establishment message, where the transceiver unit is further configured to search, by the switch, a local flow table for a flow entry matching the user plane packet, and when no flow entry matching the user plane packet is found in the local flow table, receive a flow entry request that includes a matching parameter in the user plane packet and that is sent by the switch, where the flow entry includes a match field and an instruction set;

the processing unit is further configured to search, in the storage unit, for a user profile corresponding to the matching parameter in the user plane packet, and in a case in which the user profile corresponding to the matching parameter in the user plane packet is found, generate, according to the found user profile, a flow entry matching the user plane packet; and the transceiver unit is further configured to send the generated flow entry to the switch.

Optionally, the transceiver unit is further configured to receive, in a process of deleting the bearer, a user profile deletion message sent by the gateway control plane entity, where the user profile deletion message includes an index value of the user profile of the bearer;

the processing unit is further configured to delete the user profile, which is stored in the storage unit, of the bearer according to the user profile deletion message; and the transceiver unit is further configured to send a flow entry deletion message to the switch, where the flow entry deletion message includes a value of a match field in a flow entry to be deleted.

Optionally, the transceiver unit is further configured to receive, in a process of modifying the bearer, a user profile modification message sent by the gateway control plane entity, where the user profile modification message includes the index value of the user profile of the bearer;

the processing unit is further configured to modify the user profile, which is stored in the storage unit, of the bearer according to the user profile modification message; and the transceiver unit is further configured to send the flow entry deletion message to the mobile switch, where the flow entry deletion message includes the value of the match field in the flow entry to be deleted.

Optionally, the processing unit is further configured to: after modifying the user profile of the bearer, generate an instruction set according to a modified user profile; and the transceiver unit is further configured to send a flow entry modification message to the mobile switch, where the flow entry modification message includes the generated instruction set and a value of a match field in a flow entry to be modified.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:

1. A packet forwarding system, comprising:
a gateway forwarding plane entity comprising a mobile agent and a switch;
a gateway control plane entity configured to send a user profile establishment message to the mobile agent in a process of setting up a bearer for user data through a switching network, wherein the user profile establishment message comprises a user profile of the bearer;
wherein the mobile agent is configured to: after receiving the user profile establishment message, store the user profile of the bearer;
wherein the switch is configured to: after receiving a user plane packet and when no flow entry matching the user plane packet is found in a local flow table, send a flow entry request comprising a matching parameter in the user plane packet to the mobile agent, wherein local refers to being stored on or by the switch;
wherein the mobile agent is further configured to: after receiving the flow entry request and in a case in which a user profile corresponding to the matching parameter in the user plane packet is found in a locally stored user profile, generate, according to the found user profile, a flow entry matching the user plane packet, and send the generated flow entry to the switch; and
wherein the switch is further configured to store, in the flow table, the flow entry sent by the mobile agent, and forward the user plane packet according to an instruction set in the flow entry sent by the mobile agent.

2. The system according to claim 1, wherein:
the mobile agent is further configured to: after receiving the flow entry request and in a case in which no user profile corresponding to the matching parameter in the user plane packet is found locally, send a flow entry acquiring failure message to the switch; and
the switch is further configured to: after receiving the flow entry acquiring failure message, discard the user plane packet.

3. The system according to claim 1, wherein the switch is further configured to: after receiving the user plane packet and when the flow entry matching the user plane packet is found in the flow table, forward the user plane packet according to the instruction set in the flow entry matching the user plane packet.

4. The system according to claim 1, wherein:
the gateway control plane entity is further configured to send a user profile deletion message to the mobile agent in a process of deleting the bearer, wherein the user profile deletion message comprises an index value of the user profile of the bearer, wherein the index value is associated with the user profile in the flow table;
the mobile agent is further configured to delete the user profile of the bearer according to the user profile deletion message, and send a flow entry deletion message to the switch, wherein the flow entry deletion message comprises a value of a match field in a flow entry to be deleted; and
the switch is further configured to: after receiving the flow entry deletion message, delete, from the flow table, a flow entry indicated by the flow entry deletion message.

5. The system according to claim 1, wherein:
the gateway control plane entity is further configured to send a user profile modification message to the mobile agent in a process of modifying the bearer, wherein the user profile modification message comprises an index value of the user profile of the bearer, wherein the index value is associated with the user profile in the flow table;
the mobile agent is further configured to modify the user profile of the bearer according to the user profile modification message;
the mobile agent is further configured to generate an instruction set according to a modified user profile, and send a flow entry modification message to the switch, wherein the flow entry modification message comprises the generated instruction set and a value of a match field in a flow entry to be modified; or send a flow entry deletion message to the switch, wherein the flow entry deletion message comprises a value of a match field in a flow entry to be deleted; and
the switch is further configured to delete, from the flow table according to the flow entry deletion message, a flow entry indicated by the flow entry deletion message; or modify, in the flow table according to the flow entry modification message, an instruction set in a flow entry indicated by the flow entry deletion message.

6. The system according to claim 1, wherein the switch is further configured to periodically collect statistics about access traffic of each stored flow entry, and delete a flow entry whose access traffic is zero.

7. A switch for use in a gateway forwarding plane entity comprising a mobile agent and the switch, the switch comprising:

a memory, configured to store a flow entry;
a transceiver, configured to receive a user plane packet; and
a processor, configured to: when a flow table is searched for a flow entry matching the user plane packet, send a flow entry request comprising a matching parameter in the user plane packet to the mobile agent;
wherein the transceiver is further configured to: when the processor finds, in the flow table, no flow entry matching the user plane packet, send the flow entry request comprising the matching parameter in the user plane packet to the mobile agent;
wherein the transceiver is further configured to: in a case in which the mobile agent finds, in a locally stored user profile, a user profile corresponding to the matching parameter in the user plane packet, receive a flow entry sent by the mobile agent, wherein local refers to being stored on or by the switch;
wherein the processor is further configured to store, in the flow table, the flow entry sent by the mobile agent; and
wherein the transceiver is further configured to forward the user plane packet according to an instruction set in the flow entry sent by the mobile agent.

8. The switch according to claim 7, wherein:
the transceiver is further configured to receive a flow entry deletion message sent by the mobile agent, wherein the flow entry deletion message comprises a value of a match field in a flow entry to be deleted, and
the processor is further configured to delete, from the flow table, a flow entry indicated by the flow entry deletion message; or
the transceiver is further configured to receive a flow entry modification message sent by the mobile agent, wherein the flow entry modification message comprises a generated instruction set and a value of a match field in a flow entry to be modified, and
the processor is further configured to modify, in the flow table according to the flow entry modification message, an instruction set in the flow entry indicated by the flow entry deletion message.

9. The switch according to claim 8, wherein the processor is further configured to periodically collect statistics about access traffic of each flow entry stored in the flow table, and delete a flow entry whose access traffic is zero.

10. The switch according to claim 7, wherein the processor is further configured to: after receiving the user plane packet and when a flow entry matching the user profile is found in the flow table, forward the user plane packet according to an instruction set in the flow entry matching the user profile.

11. A mobile agent for use in a gateway forwarding plane entity comprising the mobile agent and a switch, the mobile agent comprising instructions stored in a non-transitory computer-readable medium that when executed, cause:
a transceiver of the gateway forwarding plane entity to receive, in a process of setting up a bearer for user data through a switching network, a user profile establishment message sent by a gateway control plane entity, wherein the user profile establishment message comprises a user profile of the bearer;
a processor of the gateway forwarding plane entity to store, in a memory, the user profile of the bearer in the user profile establishment message;
wherein the instructions, when executed, further cause the switch to search a local flow table for a flow entry matching a user plane packet, and when no flow entry matching the user plane packet is found in the local flow table, cause the transceiver to receive a flow entry request that comprises a matching parameter in the user plane packet and that is sent by the switch, wherein the flow entry comprises a match field and an instruction set, wherein local refers to being stored on or by the switch;

wherein the instructions, when executed, further cause the processor to search, in the memory, for a user profile corresponding to the matching parameter in the user plane packet, and in a case in which the user profile corresponding to the matching parameter in the user plane packet is found, generate, according to the found user profile, a flow entry matching the user plane packet; and wherein the instructions, when executed, further cause the transceiver to send the generated flow entry to the switch.

12. The mobile agent according to claim 11, wherein:

the instructions, when executed, further cause the transceiver to receive, in a process of deleting the bearer, a user profile deletion message sent by the gateway control plane entity, wherein the user profile deletion message comprises an index value of the user profile of the bearer, wherein the index value is associated with the user profile in the flow table;

the instructions, when executed, further cause the processor to delete the user profile, which is stored in the memory, of the bearer according to the user profile deletion message; and the instructions, when executed, further cause the transceiver to send a flow entry deletion message to the switch, wherein the flow entry deletion message comprises a value of a match field in a flow entry to be deleted.

13. The mobile agent according to claim 11, wherein:

the instructions, when executed, further cause the transceiver to receive, in a process of modifying the bearer, a user profile modification message sent by the gateway control plane entity, wherein the user profile modification message comprises an index value of the user profile of the bearer, wherein the index value is associated with the user profile in the flow table;

the instructions, when executed, further cause the processor to modify the user profile, which is stored in the memory, of the bearer according to the user profile modification message; and the instructions, when executed, further cause the transceiver to send the flow entry deletion message to the switch, wherein the flow entry deletion message comprises the value of the match field in the flow entry to be deleted.

14. The mobile agent according to claim 13, wherein:

the instructions, when executed, further cause the processor to: after modifying the user profile of the bearer, generate an instruction set according to a modified user profile; and the instructions, when executed, further cause the transceiver to send a flow entry modification message to the switch, wherein the flow entry modification message comprises the generated instruction set and a value of a match field in a flow entry to be modified.

15. A packet forwarding method for use with a gateway user plane entity comprising a switch and a mobile agent, the method comprising:

after receiving a user plane packet, searching, by the switch, a local flow table for a flow entry matching the user plane packet, wherein the flow entry in the flow table comprises a match field and an instruction set, wherein local refers to being stored on or by the switch;

when finding, in the local flow table, no flow entry matching the user plane packet, sending, by the switch, a flow entry request comprising a matching parameter in the user plane packet to the mobile agent;

in a case in which the mobile agent finds, in a locally stored user profile, a user profile corresponding to the matching parameter in the user plane packet, receiving and storing, by the switch, a flow entry sent by the mobile agent; and forwarding, by the switch, the user plane packet according to an instruction set in the flow entry sent by the mobile agent.

16. The method according to claim 15, further comprising:

after receiving a flow entry deletion message sent by the mobile agent, deleting, by the switch from the flow table, a flow entry indicated by the flow entry deletion message, wherein the flow entry deletion message comprises a value of a match field in a flow entry to be deleted; or after receiving a flow entry modification message sent by the mobile agent, modifying, by the switch in the flow table according to the flow entry modification message, an instruction set in a flow entry indicated by the flow entry modification message, wherein the flow entry modification message comprises a generated instruction set and a value of a match field in a flow entry to be modified.

17. The method according to claim 15, wherein after the user plane packet is received, the method further comprises:

when finding, in the flow table, the flow entry matching the user profile, forwarding, by the switch, the user plane packet according to the instruction set in the flow entry matching the user profile.

18. A bearer setup method for use with a gateway user plane entity comprising a switch and a mobile agent, the method comprising:

receiving and storing, by the mobile agent in a process of setting up a bearer for user data through a switching network, a user profile establishment message sent by a gateway control plane entity, wherein the user profile establishment message comprises a user profile of the bearer;

when the switch finds, in a local flow table, no flow entry matching a user plane packet, receiving, by the mobile agent, a flow entry request that comprises a matching parameter in the user plane packet and that is sent by the switch, wherein a flow entry comprises a match field and an instruction set, wherein local refers to being stored on or by the switch;

locally searching, by the mobile agent, for a user profile corresponding to the matching parameter in the user plane packet; and in a case in which the user profile corresponding to the matching parameter in the user plane packet is found, generating, according to the found user profile, a flow entry matching the user plane packet, and sending the generated flow entry to the switch.

19. The method according to claim 18, further comprising:

receiving, by the mobile agent in a process of deleting the bearer, a user profile deletion message sent by the gateway control plane entity, wherein the user profile deletion message comprises an index value of the user profile of the bearer, wherein the index value is associated with the user profile in the flow table; and deleting, by the mobile agent, the user profile of the bearer according to the user profile deletion message, and sending a flow entry deletion message to the switch, wherein the flow entry deletion message comprises a value of a match field in a flow entry to be deleted.

20. The method according to claim 18, further comprising:

receiving, by the mobile agent in a process of modifying the bearer, a user profile modification message sent by the gateway control plane entity, wherein the user profile modification message comprises an index value of the user profile of the bearer, wherein the index value is associated with the user profile in the flow table; and modifying the user profile of the bearer according to the user profile modification message, generating an instruction set according to a modified user profile, and sending a flow entry modification message to the switch, wherein the flow entry modification message comprises the generated instruction set and a value of a match field in a flow entry to be modified; or modifying the user profile of the bearer according to the user profile modification message, and sending the flow entry deletion message to the switch, wherein the flow entry deletion message comprises the value of the match field in the flow entry to be deleted.

* * * * *